(12) United States Patent
Kim et al.

(10) Patent No.: US 11,472,372 B2
(45) Date of Patent: Oct. 18, 2022

(54) CONTROL SYSTEM AND CONTROL METHOD FOR CONSTRUCTION MACHINERY

(71) Applicant: Doosan Infracore Co., Ltd., Incheon (KR)

(72) Inventors: Jihoon Kim, Seoul (KR); Byoungheon Park, Incheon (KR); Wooseok Seo, Bucheon-si (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 283 days.

(21) Appl. No.: 16/814,483

(22) Filed: Mar. 10, 2020

(65) Prior Publication Data

US 2020/0290565 A1    Sep. 17, 2020

(30) Foreign Application Priority Data

Mar. 12, 2019    (KR) ......................... 10-2019-0028360

(51) Int. Cl.
  *B60R 25/24*    (2013.01)
  *B60Q 5/00*    (2006.01)
  *E02F 9/20*    (2006.01)
  *E02F 9/26*    (2006.01)
  *H04L 9/30*    (2006.01)

(52) U.S. Cl.
  CPC .............. *B60R 25/24* (2013.01); *B60Q 5/005* (2013.01); *E02F 9/20* (2013.01); *E02F 9/26* (2013.01); *H04L 9/302* (2013.01); *B60R 2325/308* (2013.01); *B60R 2325/40* (2013.01)

(58) Field of Classification Search
  None
  See application file for complete search history.

(56) References Cited

U.S. PATENT DOCUMENTS 8,222,989 B2 * 7/2012 Ziska .................. B60R 25/2018
                                                      340/5.1
9,373,201 B2 * 6/2016 Jefferies ................ B60R 25/045
(Continued)

FOREIGN PATENT DOCUMENTS

CN    104583044 A    4/2015
DE    102016008468 A1    2/2017
(Continued)

OTHER PUBLICATIONS

Extended European Search Report for related European Application No. 20162568.8; action dated Jul. 27, 2020; (6 pages).

(Continued)

*Primary Examiner* — Carlos Garcia
(74) *Attorney, Agent, or Firm* — K&L Gates LLP

(57) ABSTRACT

A control system for construction machinery includes a smart key configured to store a plurality of authentication codes and activate any one of the authentication codes, and a plurality of construction machines including a plurality of smart key modules mounted thereon respectively, the smart key modules communicating wirelessly with the smart key and having respective registration authentication codes which match with the authentication codes respectively. The construction machine including the smart key module having the registration authentication code which matches with the activated authentication code is controlled by the smart key.

13 Claims, 14 Drawing Sheets

(56) References Cited

U.S. PATENT DOCUMENTS

| | | |
|---|---|---|
| 2001/0035811 A1 | 11/2001 | Dewan |
| 2005/0099265 A1 | 5/2005 | Dix et al. |
| 2009/0278656 A1 | 11/2009 | Lopez et al. |
| 2015/0373011 A1* | 12/2015 | Subramanya ......... H04L 63/083 726/9 |
| 2018/0354458 A1* | 12/2018 | Kinugawa ............... B60R 25/24 |

FOREIGN PATENT DOCUMENTS

| | | |
|---|---|---|
| EP | 3398820 A1 | 11/2018 |
| JP | 2009030312 A | 2/2009 |
| JP | 2015214241 A | 12/2015 |

OTHER PUBLICATIONS

Chinese Office Action for related Chinese Application No. 202010170465.7; action dated Dec. 30, 2021; (9 pages).

* cited by examiner

CONTROL SYSTEM AND CONTROL METHOD FOR CONSTRUCTION MACHINERY

PRIORITY STATEMENT

This application claims priority under 35 U.S.C. § 119 to Korean Patent Application No. 10-2019-0028360, filed on Mar. 12, 2019 in the Korean Intellectual Property Office (KIPO), the contents of which are herein incorporated by reference in their entirety.

BACKGROUND

1. Field

Example embodiments relate to a method and a system for controlling construction machinery. More particularly, example embodiments relate to a control system for construction machinery using a smart key system and a control method for construction machinery using the same.

2. Description of the Related Art

In construction machinery such as an excavator, a smart key system may be provided, so that an operational function such as vehicle door unlock, vehicle door lock, engine ignition, etc. may be performed while a user holds a smart key. However, when the user operates or manages a plurality of construction machines, it may be inconvenient to carry all of a plurality of smart keys for controlling the construction machines, and in this case, there is a problem in that the probability of losing the smart key becomes high.

SUMMARY

Example embodiments provide a control system for construction machinery capable of increasing the convenience of operating a plurality of construction machines using a smart key.

Example embodiments provide a control method for construction machinery using the above control system.

According to example embodiments, a control system for construction machinery includes a smart key configured to store a plurality of authentication codes and activate any one of the authentication codes, and a plurality of construction machines including a plurality of smart key modules mounted thereon respectively, the smart key modules communicating wirelessly with the smart key and having respective registration authentication codes which match with the authentication codes respectively. The construction machine including the smart key module having the registration authentication code which matches with the activated authentication code is controlled by the smart key.

In example embodiments, the smart key may include a selection portion configured to select any one of the stored authentication codes, and a smart key controller configured to activate the selected authentication code and transmit the activated authentication code.

In example embodiments, when any one of the stored authentication codes is selected by the selection portion, an alarm device of the construction machine that matches with the activated authentication code may be controlled to operate for a predetermined time.

In example embodiments, the smart key module may include an input portion through which information of a password is inputted, the password being inputted by a user for registration of the authentication code, and a module controller configured to authenticate the password inputted by the user and register the authentication code as the registration authentication code based on the authentication result.

In example embodiments, when the inputted password is authenticated by the module controller, the activated authentication code of the near smart key which is recognized by the smart key module may be registered as a new registration authentication code.

In example embodiments, the module controller may include a first password generation portion to generate a first password, and an authentication portion to compare the first password with the password which is inputted by the user.

In example embodiments, the control system for construction machinery may further include a user terminal configured to provide the user with a graphic interface for generating a second password identical to the first password.

In example embodiments, the user terminal may include a second password generation portion to generate the second password by combining construction machine information, date and time.

In example embodiments, the first and second password generation portions may create cryptographic variables using AES algorithm or RSA algorithm.

In example embodiments, the user terminal may include an input portion through which a password is inputted for registration of the authentication code, and a terminal controller configured to transmit the inputted password to a server.

In example embodiments, the smart key module may receive the password inputted to the user terminal from the server, authenticate the received password and register the authentication code as the registration authentication code based on the authentication result.

In example embodiments, the construction machine may further include a remote management device communicating wirelessly with the server, and the smart key module may be connected to the remote management device to receive the password inputted to the user terminal.

According to example embodiments, in a control method for construction machinery, a plurality of authentication codes is stored in a smart key. Registration authentication codes which match with the authentication codes respectively are registered at smart key modules respectively, the smart key modules being mounted on a plurality of construction machines respectively. Any one of the authentication codes of the smart key is selected. The construction machine at which the registration authentication code matching with the selected authentication code is registered is controlled with the smart key.

In example embodiments, selecting any one of the authentication codes of the smart key may include clicking a selection button of the smart key.

In example embodiments, when any one of the stored authentication codes is selected by the selection portion of the smart key, an alarm device of the construction machine that matches with the activated authentication code may be controlled to operate for a predetermined time.

In example embodiments, registering the registration authentication codes which match with the authentication codes respectively at the smart key modules may include activating any one of the authentication codes of the smart key, and registering the activated authentication code as the registration authentication code for any one of the smart key modules.

In example embodiments, controlling the construction machine with the smart key may include transmitting a search signal from the smart key module, receiving a response signal in response to the search signal from the smart key, and authenticating whether or not the response signal matches with the registration authenticate code.

According to example embodiments, a plurality of authentication codes may be stored in one smart key and any one of the authentication codes may be activated. A plurality of smart key modules mounted on a plurality of construction machines respectively may have registration authentication codes matching with the authentication codes of the smart key respectively. When a user selects one of the authentication codes of the smart key, the construction machine including the smart key module having the registration authentication code which matches with the selected authentication code may be controlled by the smart key.

Additionally, when the user selects any one of the stored authentication codes through a selection button of the smart key, an alarm device (lamp or horn) of the construction machine that matches with the selected authentication code may operate for a predetermined time.

Accordingly, several construction machines may be selectively and remotely controlled by one smart key. Thus, in case that the user operates or manages a plurality of the construction machines, by carrying one smart key, it may be possible to eliminate the inconvenience of losing the smart key or carrying a plurality of smart keys.

Further, identical passwords may be generated in the smart key module and a user terminal respectively and the generated password may be inputted through another device (user terminal or smart key module) and authenticated, to thereby allow the user to easily register the smart key at the smart key module mounted on the construction machine using the user terminal such as a mobile phone while maintaining security. Security may be enhanced using AES encryption. Further, regardless of whether the communication of the user terminal is available or not, the smart key registration may be performed while maintaining security thoroughly.

BRIEF DESCRIPTION OF THE DRAWINGS

Example embodiments will be more clearly understood from the following detailed description taken in conjunction with the accompanying drawings.

DETAILED DESCRIPTION OF EXAMPLE EMBODIMENTS

Figure 1:
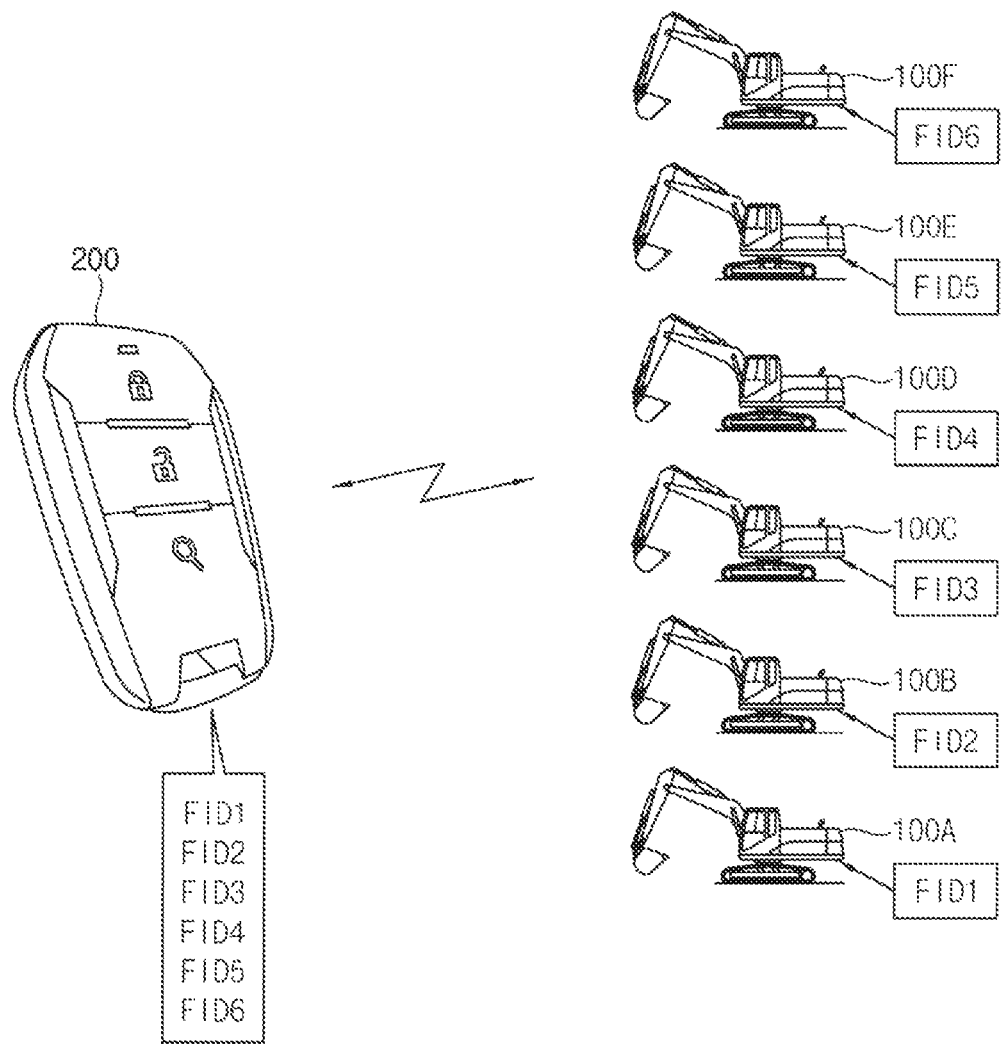
FIG. 1 is a view illustrating a control system for construction machinery in accordance with example embodiments.

Various example embodiments will be described more fully hereinafter with reference to the accompanying drawings, in which example embodiments are shown. Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art. In the drawings, the sizes and relative sizes of components or elements may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element or layer is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
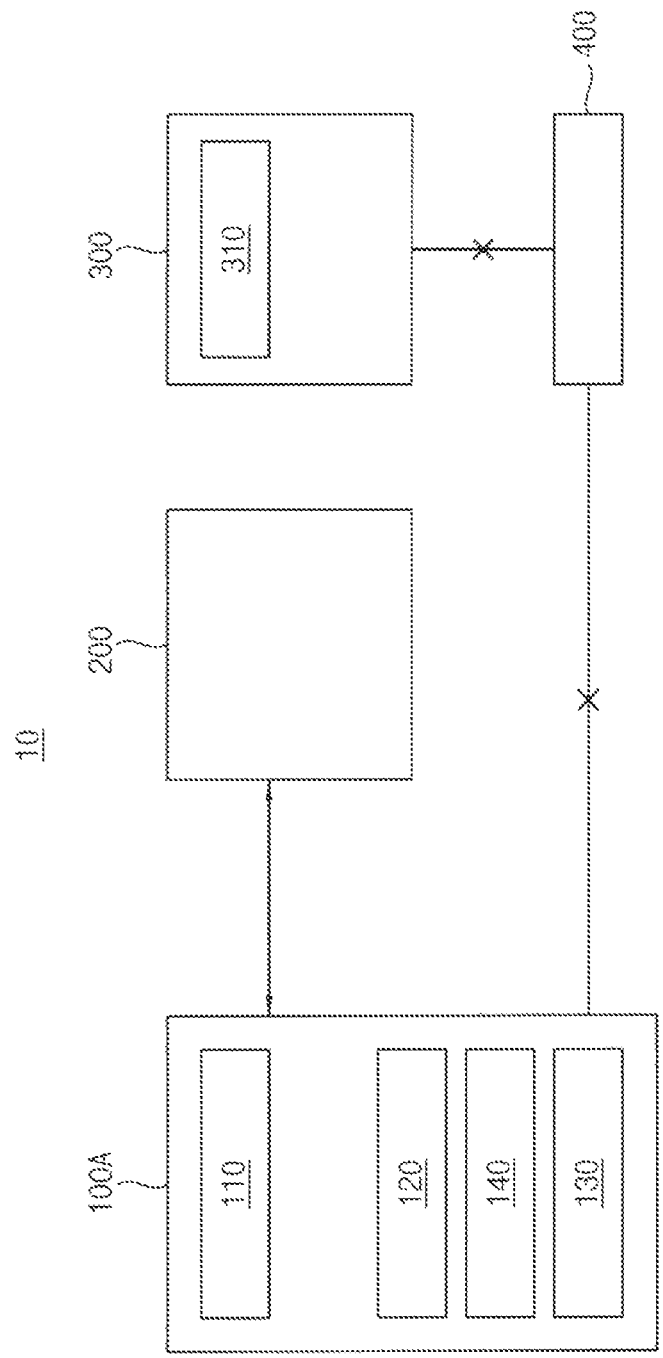
FIG. 2 is a block diagram illustrating the control system for construction machinery in FIG. 1.
Figure 3:
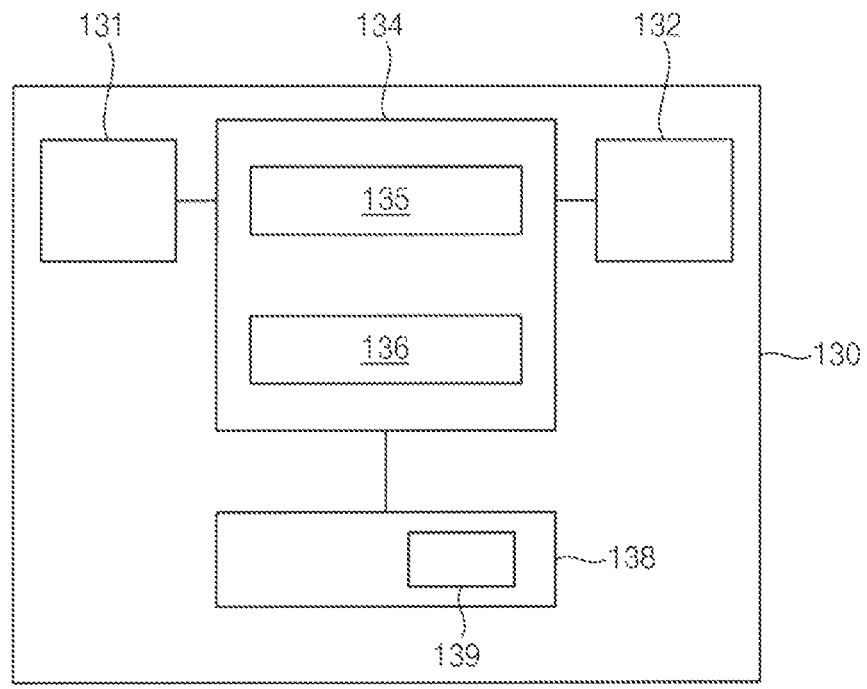
FIG. 3 is block diagram illustrating a smart key module of the control system for construction machinery in FIG. 1.
Figure 4:
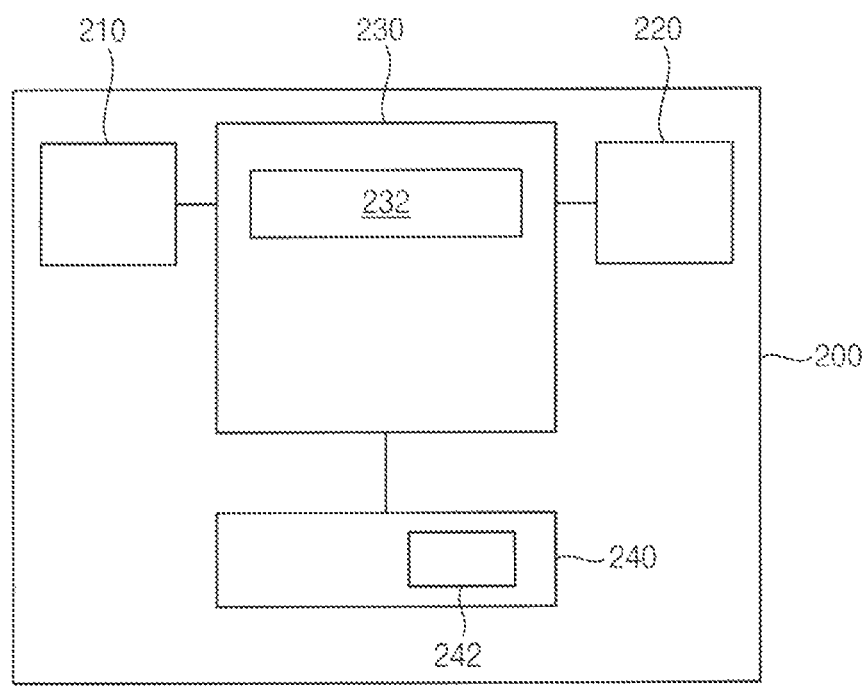
FIG. 4 is a block diagram illustrating a smart key of the control system for construction machinery in FIG. 1.
Figure 5:
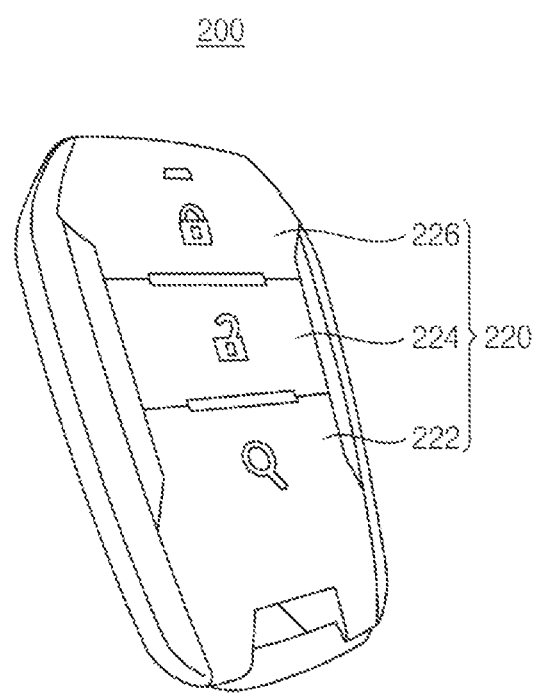
FIG. 5 is a perspective view illustrating the smart key.

FIG. 1 is a view illustrating a control system for construction machinery in accordance with example embodiments. FIG. 2 is a block diagram illustrating the control system for construction machinery in FIG. 1. FIG. 3 is block diagram illustrating a smart key module of the control system for construction machinery in FIG. 1. FIG. 4 is a block diagram illustrating a smart key of the control system for construction machinery in FIG. 1. FIG. 5 is a perspective view illustrating the smart key.

Referring to FIGS. 1 to 5, a control system for construction machinery 10 may include at least one smart key (FOB) 200 configured to selectively control a plurality of construction machines 100A, 100B, 100C, 100D, 100E, 100F and smart key modules 130 respectively installed in the construction machines 100A, 100B, 100C, 100D, 100E, 100F to communicate wirelessly. Additionally, the control system for construction machinery 10 may further include a user terminal 300 configured to provide a graphic interface for performing user settings for the construction machine.

In example embodiments, the construction machine may include an excavator, a wheel loader, a forklift, etc. Hereinafter, it will be explained that example embodiments may be applied to the excavator. However, it may not be limited thereto, and it may be understood that example embodiments may be applied to other construction machine such as the wheel loader, the forklift, etc. The smart key module 130 may be installed in the construction machine, and may communicate with the smart key 200 to perform a smart key function.

The smart key (FOB) may store a plurality of authentication codes FIB1, FID2, FID3, FID4, FID5, FID6 and may be operable of activating any one of the authentication codes. Each of the construction machines 100A, 100B, 100C, 100D, 100E, 100F may include the smart key module 130. Each of the smart key modules 130 may communicate wirelessly with the smart key 200 and may include registration authentication codes which match with the registration authentication codes respectively (in one to one correspondence).

The smart key 200 as the fob key of a smart key system may transmit and receive information with the smart key module 130. The transmissions of the information may be performed using at least one of wireless signals such as a low frequency (LF) signal, a radio frequency (RF) signal, etc. When the smart key 200 receives a search signal from the smart key module 130, the smart key 200 may be configured to transmit a response signal in response to the search signal. For example, the search signal may be an LF (low frequency) single (for example, 125 kHz), and the response signal may be a RF (radio frequency) signal (for example, 315 MHz, 433 MHz, etc). The search signal may include information requesting the authentication code, and the response signal may include information on the authentication code corresponding to the search signal.

When the smart key module 130 receives a control signal for controlling the construction machine, the smart key module 130 may transmit the search signal for searching a smart key 200 near the smart key module 130 and may receive the response signal from the smart key 200. The smart key module 130 may authenticate whether or not a registration authentication code included in the response signal matches with a pre-stored registration authentication code. If the registration authentication code included in the response signal matched with the pre-stored registration authentication code, the smart key module 130 may perform an operational function such as vehicle door unlock, vehicle door lock, engine ignition, etc. corresponding to the received control signal.

As illustrated in FIG. 2, the construction machine 100A may receive a control signal from the smart key 200 or a remote control server 400, and may perform an operational function correspond to the received control signal. For example, the construction machine 100A may include a GPS module 110, a remote management device 120, a user interface device 140 and a smart key module 130.

The GPS module 110 may include a GPS (global positioning system) receiver. The GPS module 110 may receive a signal transmitted from a GPS satellite to calculate a current location of the construction machine 100A and to generate construction machine location information.

The remote management device 120 may communicate directly a network connected with an external device, for example, the remote control server 400 or through a network connected to the remote control server 400 in order to remotely control the construction machine 100A. The network connected to the remote control server 400 may include a convention wireless communication network and a wired communication network. Additionally, the remote management device 120 may receive a remote control signal from the remote control server 400. As described later, the smart key module 130 may receive a password, which is inputted to the user terminal 300, from the remote control server 400. For example, the remote management device 120 may include a TMS (Tele-Management System) module.

The smart key module 130 may receive the control signal such as an engine ignition signal to perform the operational function corresponding to the received remote control signal. As described later, the smart key module 130 may connected to the remote management system 120 to receive the password which is inputted to the user terminal 300. The GPS module 110, the remote management device 120 and the smart key module 130 may communicate with each other using CAN (Controller Area Network) communication. The smart key module 130 may be provided integrally with a vehicle control unit (VCU) or an engine control unit (ECU) for an overall control of the construction machine or may be provided as a separate control unit. When the operational function of the construction machine corresponding to the received remote control signal is required to be performed, the smart key module 130 may transmit a signal requesting the operational function of the construction machine to the vehicle control unit or the engine control unit. In case that the smart key module 130 is provided integrally with the vehicle control unit to perform the function of the vehicle control unit, the smart key module 130 may directly output the control signal to a driving portion for the required operational function.

The user interface device 140 may be configured in the form of an information output device for outputting information to the user and an information input device for allowing the user to inputting information, and a display device and the information input device may be provided integrally with each other to be in the form of a display unit of a instrument panel that can provide user setting graphic interface. The user interface device 140 may be connected to an input portion 132 of the smart key module 130 through CAN network, and may be provided integrally with the input portion 132.

As illustrated in FIG. 3, the smart key module 130 may include a communication portion 131, an input portion 132, a module controller 134 and a module storage portion 138.

The communication portion 131 may include at least one information transceiver module configured to search for a smart key 200 near the smart key module 130 and to certificate. In example embodiments, the information transceiver module may include an LF communication module having an LF antenna and a RF transceiver module having a RF antenna. In case that the LF antenna and the RF antenna are included, the LF antenna may transmit the search signal (LF signal) and the RF antenna may receive the response signal (RF signal).

The input portion 132 may be a port connected to the user interface device 140 which is used to register the authentication code of the smart key 200 activated by a user to the smart key module 130, and may be the user interface device 140 itself. The user may select a registration mode for registering the user's activated authentication code of the smart key 200 through the user interface device 140, and may input a password that is required to be inputted for registration of the authentication code. The input portion 132 may receive the mode selection information and the information related to the password from the user interface device 130 and may transmit to the module controller 134.

The module controller 134 may be a central control device of the smart key module capable of executing a control program for general smart key operation. The module controller 134 may execute a control program for registering a smart key for registering an activated authentication code of the smart key 200. In particular, the module controller 134 may include a first password generation portion 135 for generating a first password in the smart key registration mode and an authentication portion 136 for comparing the generated first password with the password which is inputted through the input unit 132. In example embodiments, the first password generated by the first password generation portion 135 by the selection of the user in the smart key registration mode may be provided to the user through the user interface device 140.

The module storage portion 138 may include a program region for storing the control program for general smart key operation and the control program for the smart key registration and a temporary region for storing data generated during the execution of the control program. Additionally, the module storage portion 138 may include a registration authentication code data area 139 for storing the activated authentication code of the smart key 200 as a new registration authentication code when authenticated by the authentication portion 136. A plurality of the authentication codes of the smart key 200 may be stored in the registration authentication code data area 139. Thus, a plurality of smart keys for which an authentication procedure, which will be described later, is completed, may be registered to one construction machine, thereby providing conveniences for management when each construction machine is managed by a plurality of personnel.

As illustrated in FIG. 4, the smart key 200 may include a communication portion 210, an input portion 220, a smart key controller 230 and a smart key storage portion 240.

The communication portion 210 may include at least one information transceiver module configured to transmit and receive information with the smart key module 130 installed in the construction machine. The information transceiver module may include an LF communication module and a RF transceiver module.

The input portion 220 may include an operation selection portion for smart key operation and smart key activation. As illustrated in FIG, the input portion 132 may include a selection button 222 for authentication code selection, a first operation selection button 224 for vehicle door unlock, a second operation selection button 226 for vehicle door lock, etc.

The user may select and activate any one of the authentication codes stored in the smart key 200 by clicking the selection button 222. The construction machine including the smart key module 130 having a registration authentication code which matches with the activated authentication code installed therein may be controlled by the smart key 200. In example embodiments, each time the selection button 222 is clicked, the stored authentication codes may be sequentially activated, and the repeated click of the selection button 222 may be continued until the authentication code corresponding to the construction machine which the user wants is activated.

When the user selects any one of the stored authentication codes (e.g., FID1) through the selection button 222, an alarm device (lamp or horn) of the construction machine (e.g., 100A) that matches with the activated authentication code may operate for a predetermined time.

The smart key controller 230 may execute a control program for general smart key operation. The smart key controller 230 may execute a control program for registering a smart key for registering an activated authentication code of the smart key 200. In particular, the smart key controller 230 may include an authentication code processor 232 configured to activate an authentication code signal activated by the selection button and transmit through the communication portion 210.

The smart key storage portion 240 may include a program region for storing the control program for general smart key operation and the control program for the smart key registration and a temporary region for storing data generated during the execution of the control program. Additionally, the smart key storage portion 240 may include an authentication code data area 139 for storing a plurality of authentication codes and an authentication code activated by the authentication code processor 232.

Referring again to FIG. 2, the user terminal 300 may generate construction machine control information for remotely controlling the construction machine. The user terminal 300 may provide a user with a graphic interface for registering the activated authentication code of the smart key 200. For example, the user terminal 300 may include a smart phone, a smart pad, PDA, etc. In some embodiments, the user terminal 300 may include a construction machine control application (APP) 310.

The construction machine control APP 310 may provide a user with an interface for generating the construction machine control information. The construction machine control APP 310 may provide the user with a smart key registration interface for registering the smart key.

In particular, the user terminal 300 may include an input portion and a terminal controller. The input portion of the user terminal 300 may be configured in the form of an information output device and an input device that can provide user setting graphic interface, and may transmit information corresponding to user's manipulation of the input device based on the information outputted from the information output device to a terminal controller. Similarly to the user interface device of the smart key module as described above, the input portion of the user terminal 300 may be configured that the terminal controller is connected to a display device that can provide information output and input. The terminal controller may include a second password generation portion for generating a second password. The second password may be identical to the first password which is generated by the first password generation portion 135. The second password generated by the second password generation portion may be provided to a user through the input portion of the user terminal 300.

In example embodiments, the first and second password generation portions may create cryptographic variables using AES (advance encryption standard) algorithm or RSA (Rivest Sharmir Adleman) algorithm. The first and second password generation portions may generate the passwords by combining construction machine information, date and time.

In example embodiments, a user may select the smart key registration mode and then input a password, and information of the password may be inputted to the terminal controller through the input portion. In this case, the user terminal 300 may transmit the inputted password to the remote control server 400, and the remote control server 400 may transmit the password inputted to the user terminal 300 to the smart key module 130 through the remote management device 120.

Hereinafter, a method of controlling the construction machine using the control system for construction machinery in FIG. 1 will be explained.

Figure 6:
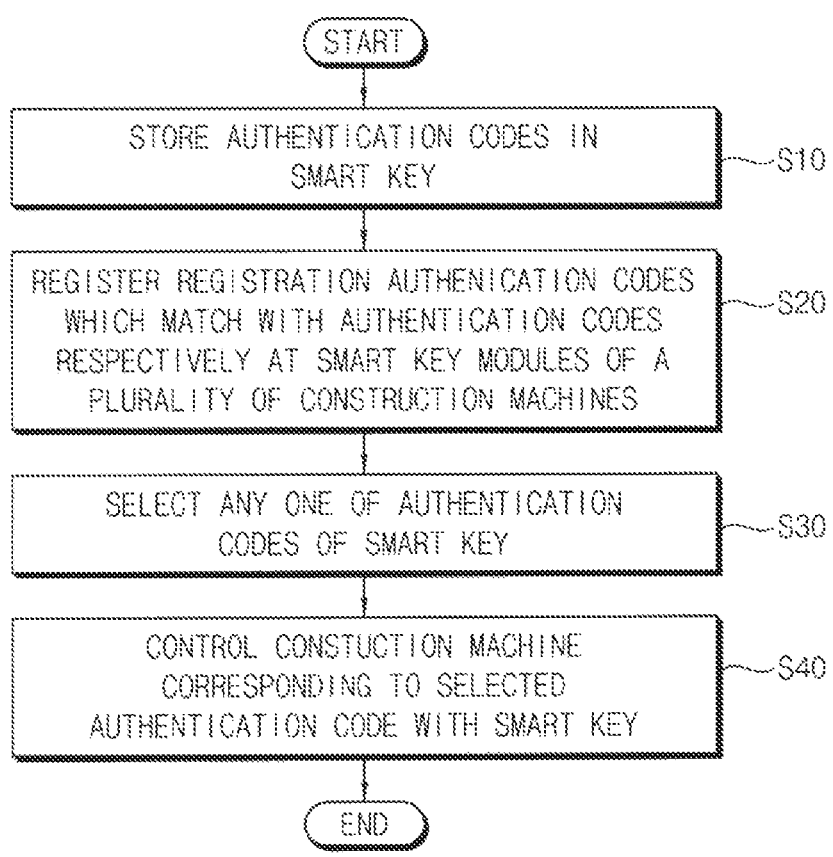
FIG. 6 is a flow chart illustrating a control method for construction machinery in accordance with example embodiments.

FIG. 6 is a flow chart illustrating a control method for construction machinery in accordance with example embodiments.

Referring to FIGS. 1 to 6, first, a plurality of authentication codes FID1, FID2, FID3, FID4, FID5, FID6 may be stored in the smart key 200 (S10), and registration authentication codes which match with the authentication code respectively may be registered respectively in the smart key modules 130 which are installed in a plurality of construction machines 100A, 100B, 100C, 100D, 100E, 100F (S20). Then, any one of the authentication codes of the smart key 200 may be selected (S30), and the construction machine corresponding to the selected authentication code may be controlled with the smart key 200 (S40).

In example embodiments, a plurality of the authentication codes FID1, FID2, FID3, FID4, FID5, FID6 may be stored in the smart key storage portion 240 of the smart key 200. A stage of registering the registration authentication codes which match with the authentication codes respectively in the smart key modules 130 of a plurality of the construction machines 100A, 100B, 100C, 100D, 100E, 100F will be described later.

Then, a user may select and activate any one of the authentication codes of the smart key 200 by clicking the selection button 222. The construction machine including the smart key module 130 having the registration authentication code which matches with the activated authentication code may be controlled by the smart key 200.

When the user selects any one of the stored authentication codes (e.g., FID1) through the selection button 222, an alarm device (lamp or horn) of the construction machine (e.g., 100A) that matches with the activated authentication code may operate for a predetermined time.

When the user clicks the selection button 222 of the smart key 200 again to select another one of the stored authentication codes (e.g., FID2), an alarm device (lamp or horn) of the construction machine (e.g., 100B) that matches with the activated authentication code may operate for a predetermined time.

As mentioned above, a plurality of the authentication codes FID1, FID2, FID3, FID4, FID5, FID6 may be stored in the smart key 200 and the smart key may be operable that any one of the authentication codes may be activated. A plurality of the smart key modules 130 installed respectively in a plurality of the construction machines 100A, 100B, 100C, 100D, 100E, 100F may have the registration authentication codes which match with the authentication codes respectively. When the user activates any one of the authentication codes of the smart key 200, the construction machine including the smart key module 130 having the registration authentication code which matches with the activated authentication code installed therein may be controlled by the smart key 200.

Accordingly, several construction machines 100A, 100B, 100C, 100D, 100E, 100F may be selectively and remotely controlled by one smart key 200. Thus, in case that the user operates or manages a plurality of the construction machines, by carrying one smart key, it may be possible to eliminate the inconvenience of losing the smart key or carrying a plurality of smart keys. Further, since a plurality of the registration authentication codes can be stored in each of the construction machines 100A, 100B, 100C, 100D, 100E, 100F, the use of multiple smart keys may be possible. Therefore, a plurality of personnel can easily operate or manage the construction machine.

Hereinafter, a method of registering the smart key at the smart key module which is installed in any one of a plurality of construction machines in the control system for construction machinery in FIG. 1 will be explained.

Figure 7A:
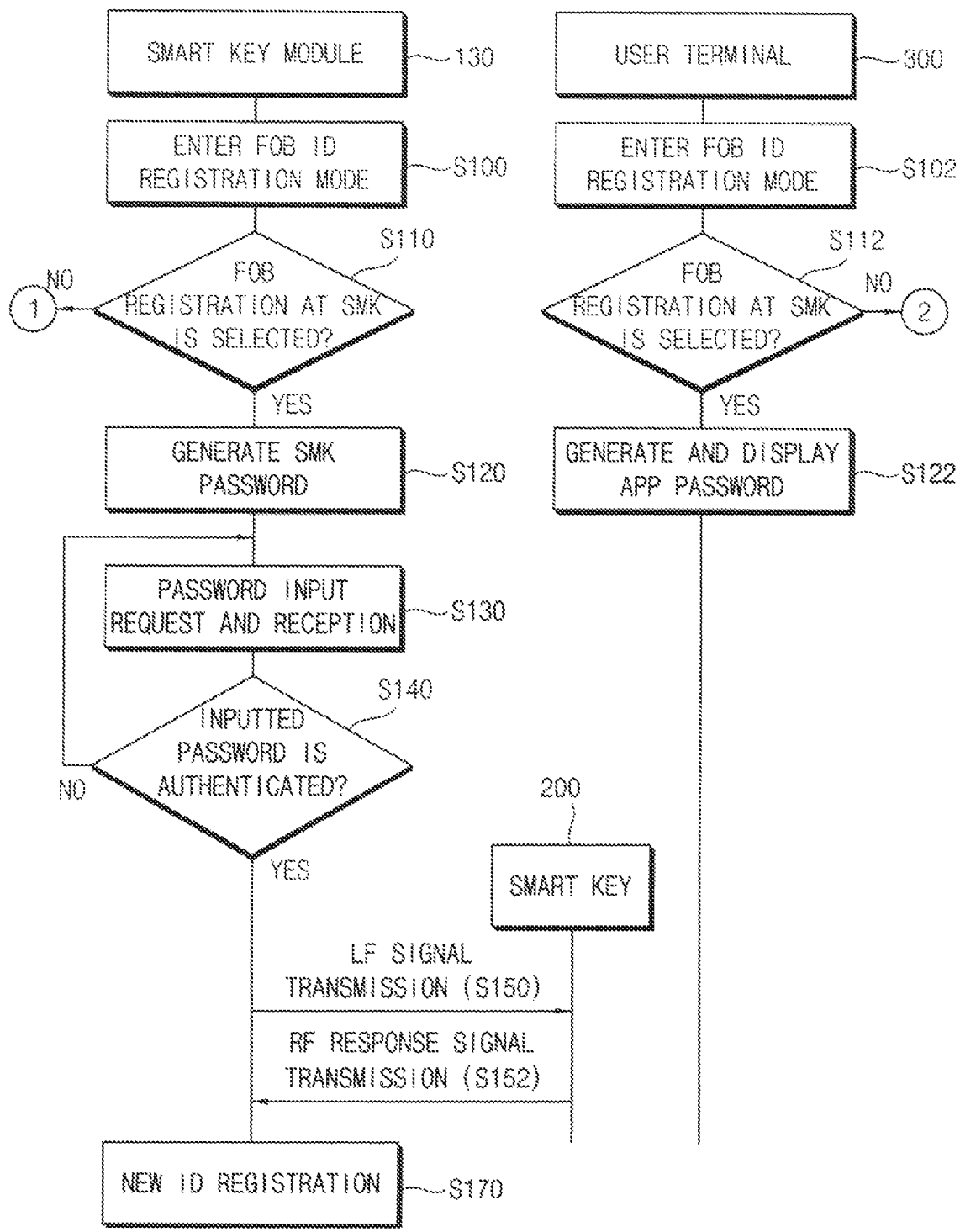
FIGS. 7A and 7B are flow charts illustrating a registration method of a smart key for construction machinery in accordance with example embodiments.
Figure 7B:
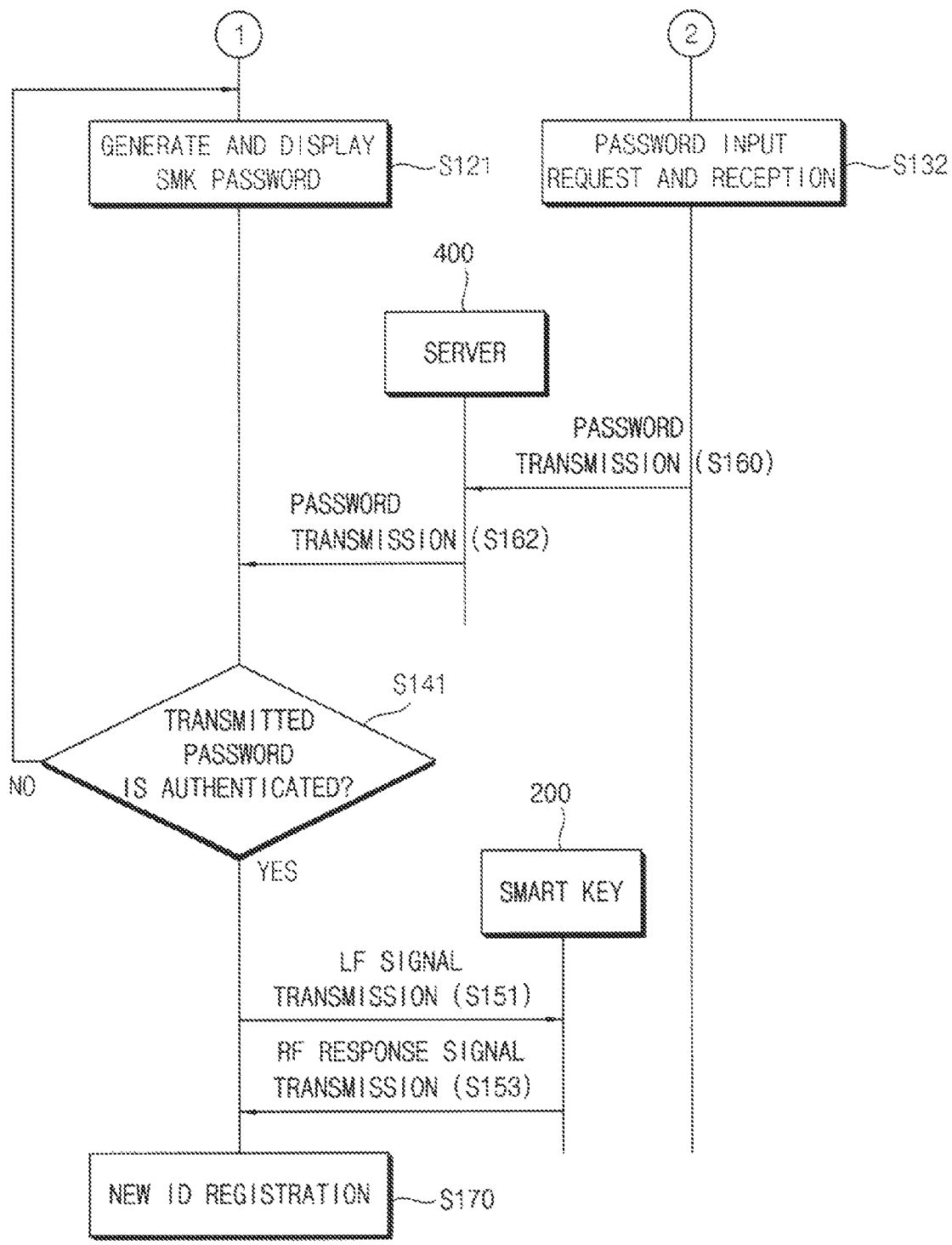

FIGS. 7A and 7B are flow charts illustrating a registration method of a smart key for construction machinery in accordance with example embodiments. FIGS. 8A to 8D are screens provided through an input portion of a smart key module in a smart key registration mode. FIGS. 9A to 9E are views illustrating screens provided through an input portion of a user terminal in a smart key registration mode.

Referring to FIGS. 1 to 9E, first, a smart key (FOB ID) registration mode is entered in the smart key module (SMK) 130 installed in the construction machine 100A (S100), and a smart key (FOD ID) registration mode is entered in the user terminal (APP) 300 (S102).

Figure 8A:
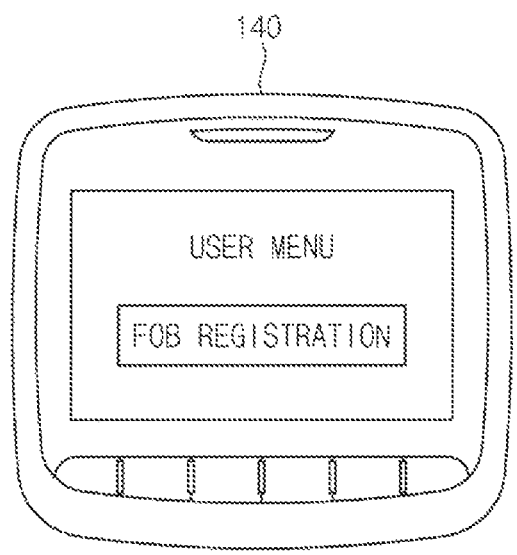
FIGS. 8A to 8D are screens provided through an input portion of a smart key module in a smart key registration mode.
Figure 9A:
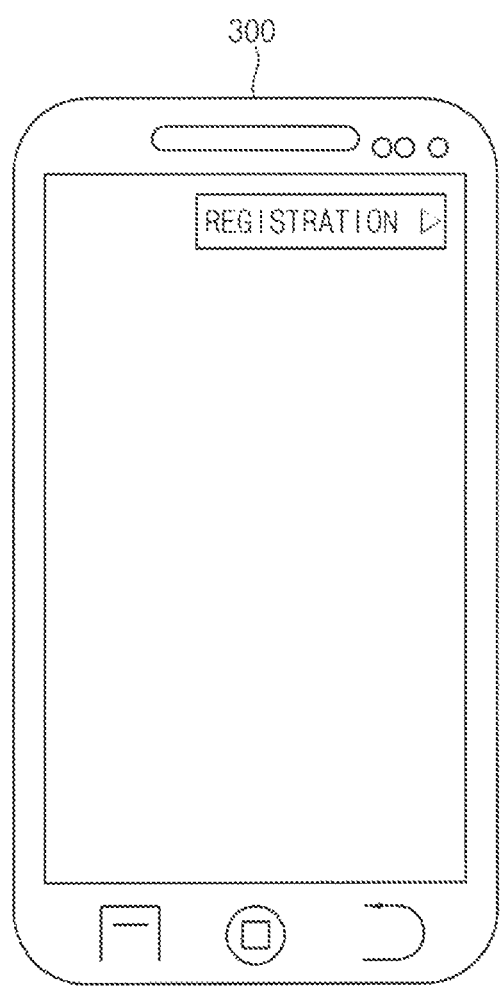
FIGS. 9A to 9E are views illustrating screens provided through an input portion of a user terminal in a smart key registration mode.

In example embodiments, as illustrated in FIGS. 8A and 9A, the user interface device 140 of the construction machine and the user terminal 300 may provide the user with a user menu for inquiring whether or not to enter the smart key (FOB ID) registration mode. If the user's entry request of the smart key registration mode is selected, the smart key (FOB ID) registration mode may be switched.

Figure 8B:
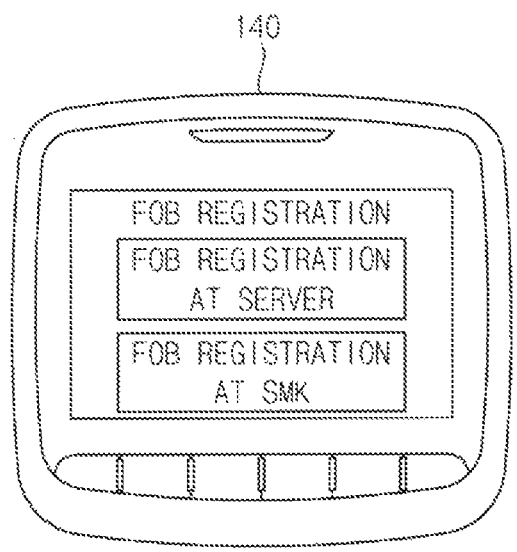
Figure 9B:
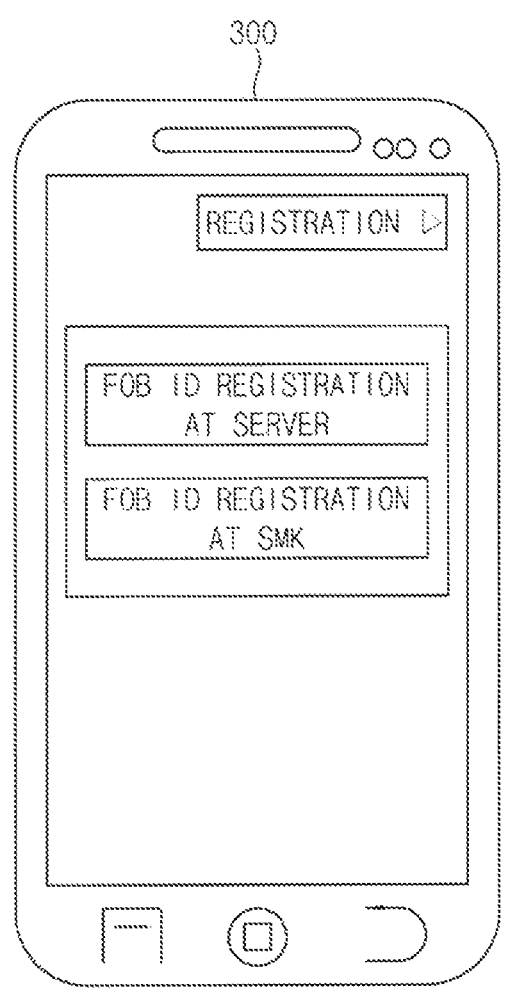

As illustrated in FIGS. 8B and 9B, when the smart key registration mode is started, user interface device 140 of the construction machine and the user terminal 300 may provide the user with a user menu for inquiring whether or not to proceed with the smart key registration (S110, S112).

Figure 9C:
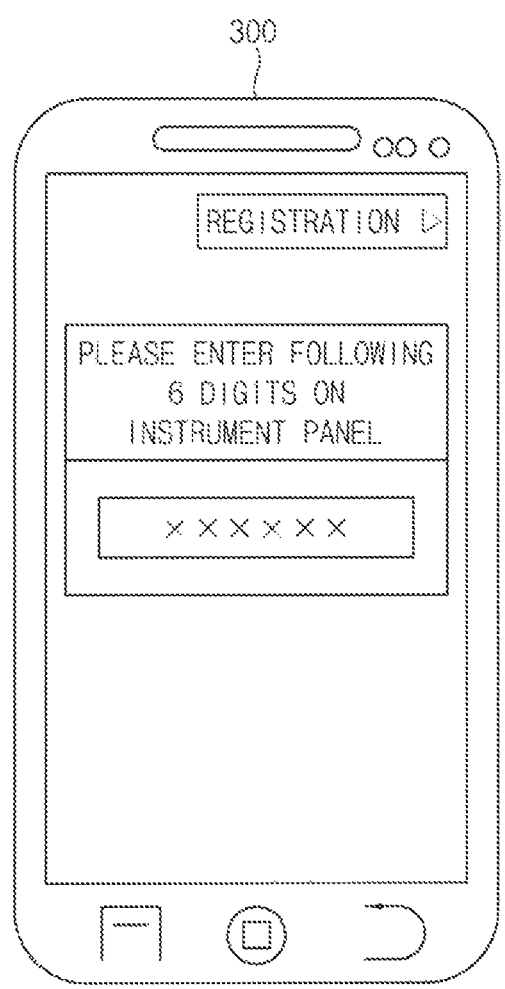

As illustrated in FIG. 7A, when the user chooses to proceed with the smart key registration through the user interface device 140 of the construction machine (FOB REGISTRATION AT SMK), the module controller 134 of the smart key module 130 may generate a first password (S120). Additionally, as illustrated in FIG. 9C, the user terminal 300 may generate and provide a second password identical to the first password to the user (S122).

In example embodiments, the first password generation portion 135 of the smart key module 310 and the user terminal 300 may create cryptographic variables using AES algorithm or RSA algorithm. The first password generation portion 135 of the smart key module 310 and the user terminal 300 may generate the passwords by combining construction machinery information, date and time. In this case, the user terminal 300 may perform the smart key registration mode in a state in which security is maintained through AES encryption even in a situation where communication is not available.

Figure 8C:
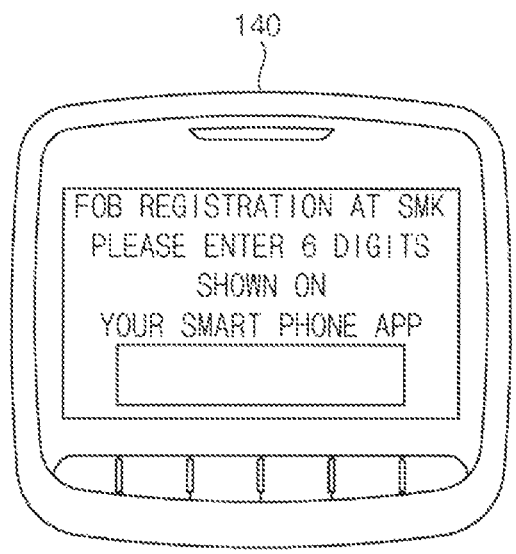

Then, as illustrated in FIG. 8C, the user interface device 140 of the construction machine may ask the user to input a password the same as the second password provided by the user terminal 300 (S130), and the smart key module 310 may compare the password inputted through the input portion 132 to authenticate (S140).

The authentication portion 136 of the smart key module 310 may compare the first password generated by the first password generation portion 135 and the password which is inputted through the user interface device 140 of the construction machine each other to authenticate.

Then, when the inputted password is authenticated, the authentication code of the near smart key 200 which is recognized by the smart key module 130 may be registered as a new registration authentication code (S170).

In particular, the communication portion 131 of the smart key module 130 may transmit a search signal (LF signal) (S150), and the communication portion 210 of the smart key module 200 may transmit a response signal (RF signal) in response to the search signal (S152). In order to increase the accuracy of the RF information transmission and reception, the transmission of the response signal may proceed by contacting the smart key 200 with a specific position within a cabin of the construction machine. An RF transceiver which is connected to be capable of transmitting and receiving information with the smart key module 130 and transmitting and receiving an RF signal of the smart key 200 may be disposed at the specific location. In example embodiments, the RF transceiver may be a button start key provided in the cabin.

In example embodiments, the response signal may include authentication information of the smart key 200, that is, the activated authentication code of the authentication codes stored in the smart key 200. The smart key module 130 may store the activated authentication code of the smart key 200 as a new registration authentication code when authenticated by the authentication portion 136.

Figure 8D:
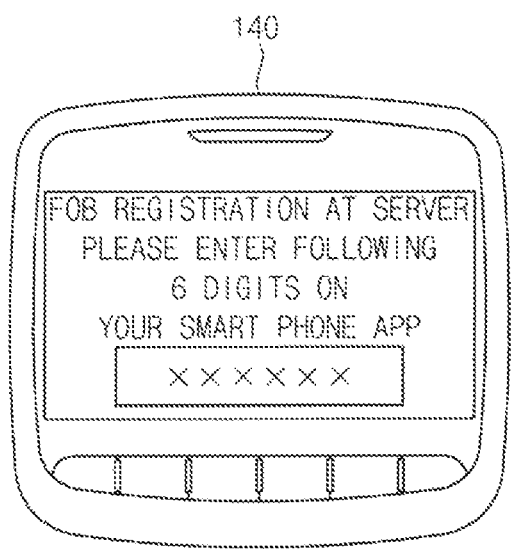

As illustrated in FIG. 7B, when the user chooses to proceed with the smart key registration through the user terminal 300 (FOB REGISTRATION AT SERVER), as illustrated in FIG. 8D, the smart key module 130 may generate and provide a first password to the user (S121).

In example embodiments, the first password generation portion 135 of the smart key module 310 may create cryptographic variables using AES algorithm or RSA algorithm. The first password generation portion 135 of the smart key module 310 may generate the password by combining construction machinery information, date and time.

Figure 9D:
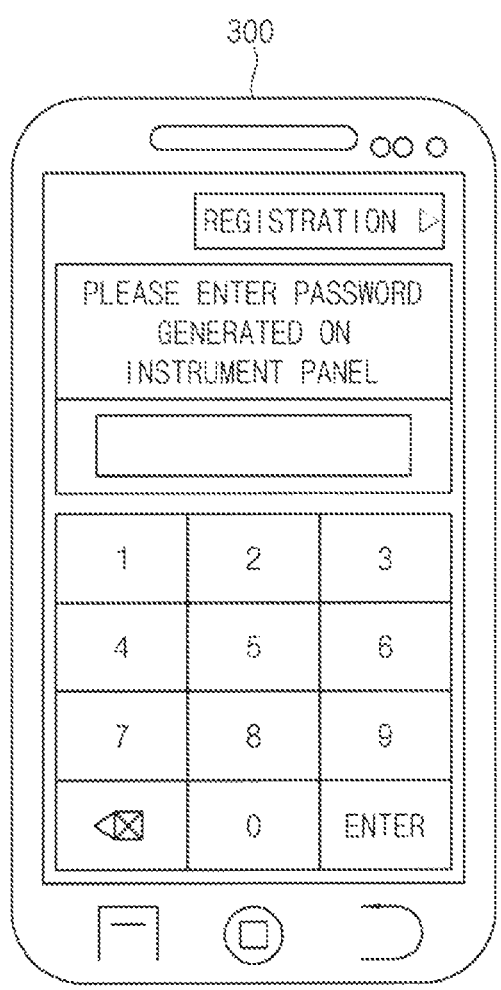
Figure 9E:
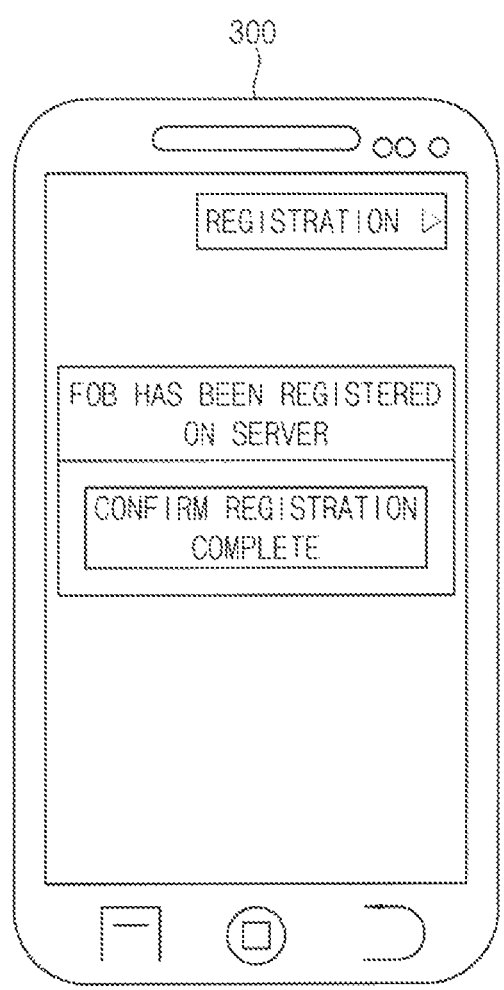

Then, as illustrated in FIG. 9D, the user terminal 300 may ask the user to input a password the same as the first password provided by the smart key module 130 (S132), and the user terminal 300 may transmit the inputted password to the remote control server 400 (S160), the remote control server 400 may transit the password to the smart key module 130 through the remote management device 120 (S162). Then, the smart key module 310 may compare the password inputted through the remote management device 120 to authenticate (S141).

The authentication portion 136 of the smart key module 310 may compare the first password generated by the first password generation portion 135 and the password which is inputted through the user terminal 300 each other to authenticate.

Then, when the inputted password is authenticated, the authentication code of the near smart key 200 which is recognized by the smart key module 130 may be registered as a new registration authentication code (S170).

In particular, the communication portion 131 of the smart key module 130 may transmit a search signal (LF signal) (S151), and the communication portion 210 of the smart key module 200 may transmit a response signal (RF signal) in response to the search signal (S153).

In example embodiments, the response signal may include authentication information of the smart key 200, that is, the activated authentication code of the authentication codes stored in the smart key 200. The smart key module 130 may store the activated authentication code of the smart key 200 as a new registration authentication code when authenticated by the authentication portion 136.

When the activated authentication code of the smart key 200 is registered, the input portion 132 of the smart key module 130 and the construction machine control APP of the user terminal 300 may provide the user with a user menu for inquiring whether or not to exit the smart key (FOB ID) registration mode, and by confirming by the user, the smart key (FOB ID) registration mode may be terminated.

As mentioned above, identical passwords may be generated in the smart key module 130 and the user terminal 300 respectively and the generated password may be inputted through another device (user terminal or smart key module) and authenticated, to thereby allow the user to easily register the smart key at the smart key module mounted on the construction machine using the user terminal such as a mobile phone while maintaining security. Security may be enhanced using AES encryption. Further, regardless of whether the communication of the user terminal is available or not, the smart key registration may be performed while maintaining security thoroughly.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. A control system for construction machinery, comprising:
    a smart key configured to store a plurality of authentication codes and activate any one of the authentication codes; and
    a plurality of construction machines including a plurality of smart key modules mounted thereon respectively, the smart key modules communicating wirelessly with the smart key and having respective registration authentication codes which match with the authentication codes respectively,
    wherein the construction machine including the smart key module having the registration authentication code which matches with the activated authentication code is controlled by the smart key,
    wherein each of the smart key modules comprises:

an input portion through which information of a password is inputted, the password being inputted by a user in order to register the registration authentication code which matches with any activated one of the authentication codes at any one of the smart key modules; and
a module controller configured to authenticate the password inputted by the user and register the activated authentication code as the registration authentication code for any one of the smart key modules based on the authentication result,
wherein the module controller comprises:
a first password generation portion to generate a first password; and
an authentication portion to compare the first password with the password which is inputted by the user, and
wherein when the inputted password is authenticated by the module controller, the activated authentication code of the smart key which is recognized by the smart key module is registered as a new registration authentication code.

2. The control system for construction machinery of claim 1, wherein the smart key comprises
a selection portion configured to select any one of the stored authentication codes; and
a smart key controller configured to activate the selected authentication code and transmit the activated authentication code.

3. The control system for construction machinery of claim 2, wherein when any one of the stored authentication codes is selected by the selection portion, an alarm device of the construction machine that matches with the activated authentication code is controlled to operate for a predetermined time.

4. The control system for construction machinery of claim 1, further comprising:
a user terminal configured to provide the user with a graphic interface for generating a second password identical to the first password.

5. The control system for construction machinery of claim 4, wherein the user terminal comprises a second password generation portion to generate the second password by combining construction machine information, date and time.

6. The control system for construction machinery of claim 5, wherein the first and second password generation portions create cryptographic variables using AES algorithm or RSA algorithm.

7. The control system for construction machinery of claim 4, wherein the user terminal comprises
an input portion through which a password is inputted for registration of the authentication code; and
a terminal controller configured to transmit the inputted password to a server.

8. The control system for construction machinery of claim 7, wherein the smart key module receives the password inputted to the user terminal from the server, authenticates the received password and registers the authentication code as the registration authentication code based on the authentication result.

9. The control system for construction machinery of claim 8, wherein the construction machine further comprises a remote management device communicating wirelessly with the server, and
wherein the smart key module is connected to the remote management device to receive the password inputted to the user terminal.

10. A control method for construction machinery, comprising:
storing a plurality of authentication codes in a smart key;
registering registration authentication codes which match with the authentication codes respectively at smart key modules, the smart key modules being mounted on a plurality of construction machines respectively;
selecting any one of the authentication codes of the smart key; and
controlling the construction machine at which the registration authentication code matching with the selected authentication code is registered, with the smart key,
wherein registering the registration authentication codes respectively at the smart key modules comprises:
generating a first password, in a first password generation portion of any one of the smart key modules, by combining construction machinery information, date and time;
comparing a password inputted by the user with the first password to authenticate, in an authentication portion of any one of the smart key modules;
activating any one of the authentication codes stored in the smart key; and
recognizing the activated authentication code of the smart key when the inputted password is authenticated and registering as a new registration authentication code for any one of the smart key modules.

11. The control method of claim 10, wherein selecting any one of the authentication codes of the smart key comprises clicking a selection button of the smart key.

12. The control method of claim 11, wherein when any one of the stored authentication codes is selected by the selection portion of the smart key, an alarm device of the construction machine that matches with the activated authentication code is controlled to operate for a predetermined time.

13. The control method of claim 10, wherein controlling the construction machine with the smart key comprises
transmitting a search signal from the smart key module;
receiving a response signal in response to the search signal from the smart key; and
authenticating whether or not the response signal matches with the registration authenticate code.

* * * * *